July 31, 1962 E. F. BOOSE 3,047,815

PHASE COMPONENT ELIMINATOR

Filed July 3, 1959

*INVENTOR.*

EMERY F BOOSE

*BY*

Irving M. Freedman

HIS ATTORNEY

United States Patent Office 3,047,815

Patented July 31, 1962

3,047,815

PHASE COMPONENT ELIMINATOR

Emery F. Boose, Georgetown, Mass., assignor to General Electric Company, a corporation of New York Filed July 3, 1959, Ser. No. 824,892

6 Claims. (Cl. 330—86)

Figure 1:
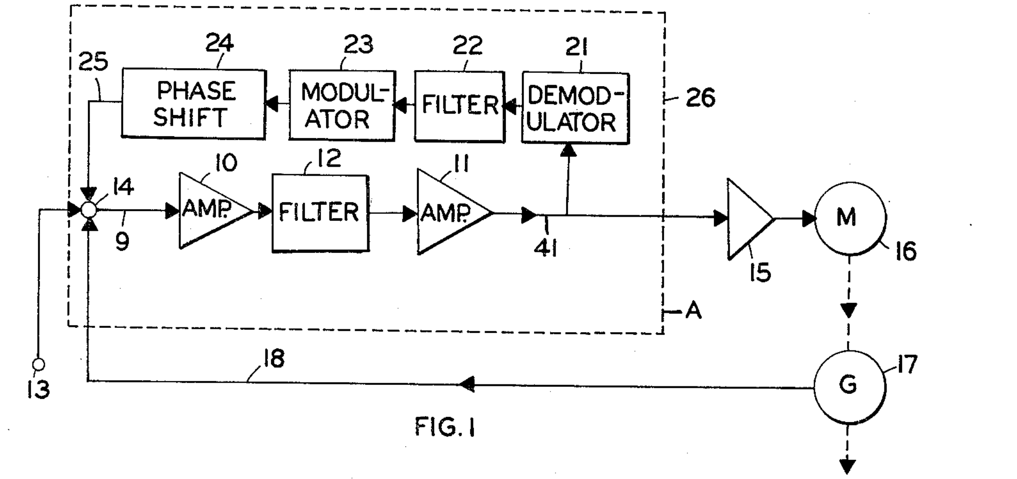

This invention relates to improved circuits for eliminating from a signal of a particular frequency those signal components bearing undesired phase relationships with respect to the signal being detected.

While not limited thereto, this invention has principal utility in servo systems wherein a detected signal of either of two opposite phase relationships relative to a reference signal and corresponding to a detected condition is amplified and utilized to drive a reversible two phase servo motor to perform an indicating or control function in response to a measured condition. It is desirable to eliminate the quadrature phase components of the detected or control signal since these components tend to saturate the amplifier, placing a limitation on the gain and frequency response, and under some circumstances introduce errors into the servo system. The problem is particularly troublesome in the case of speed control devices. Furthermore, quadrature components of the detected signal, if amplified and applied to the servo motor, perform no work and have no effect upon the output drive but dissipate their energy by heating the drive motor.

By the very nature of a servo system, the quadrature components of the detected signal are almost always much greater than the signal itself, and elimination of the quadrature components contributes significantly to the performance of the system.

Another problem encountered in servo systems of the type described is undesired phase shifts of the detected signal which occur in the amplifying stages required to develop sufficient power to drive the servo motor through changes in circuit parameters such as caused by the heating of components during operation.

An object of this invention is to provide an improved phase quadrature component or eliminator circuit.

Another object of the invention is to provide an improved phase component eliminator for servo system amplifiers which eliminates undesired components of the detected signal while automatically limiting changes in the phase of the input signal which tend to occur in the amplifier itself.

Still another object of this invention is to provide an improved amplifying circuit for a servo system incorporating a feedback path which reduces the gain of the amplifier for only a particular phase of a single frequency.

Further objects and advantages of the invention will become apparent as the following description proceeds and the features of novelty which charactertize the invention will be pointed out with particularity in the claims annexed to and forming a part of this specification.

In accordance with one form of the invention, the servo system amplifier is provided with a feedback path to develop a negative feedback signal which opposes the quadrature voltage appearing at the input to the amplifier and also compensates for phase changes which might otherwise occur to the detected signal in passing through the amplifier. The feedback circuit includes a demodulator which develops a direct current voltage the amplitude and polarity of which are related to the magnitude and phase of the quadrature components. The direct current is in turn modulated to provide an alternating signal also related to the quadrature components and at the frequency of the detected signal. The modulated alternating signal is then combined with the input of the amplifier with a phase such as to cancel the unwanted quadrature components and in a manner so as to compensate for phase shift variations which may have been introduced by the amplifier.

More particularly, the demodulator includes a rectifier ring and a reference signal having a frequency the same as the input signal and a phase at quadrature to the amplifier output signal to provide a direct current signal related to the quadrature components. The modulator also includes a rectifier ring. The reference signal for the modulator has the same frequency as the input signal and a phase at quadrature with the input signal.

Figure 2:
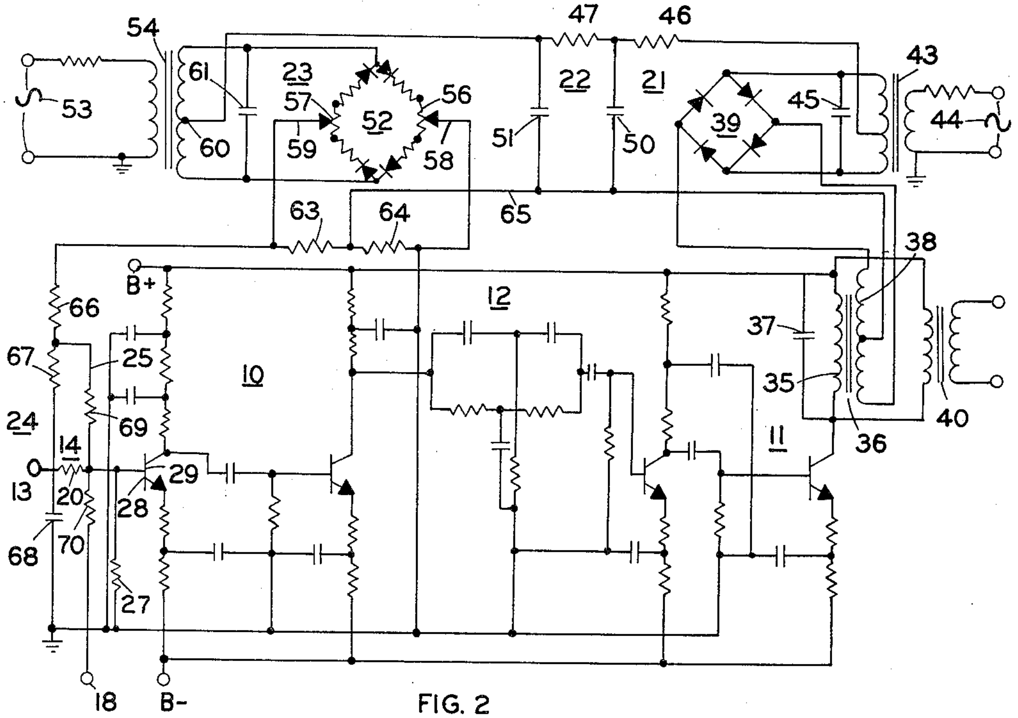

For a better understanding of this invention, reference may be had to the following description taken in connection with the accompanying drawings in which:

FIG. 1 is a schematic representation in block diagram form of a servo system embodying the subject invention; and FIG. 2 is a schematic diagram of the amplifying and feedback circuitry associated with that portion of FIG. 1 enclosed within the dashed-line rectangle "A."

Referring to FIG. 1, a servo system is shown which includes amplifiers 10 and 11, separated by filter 12 and having an input signal 13 which passes through adding circuit 14. The output 41 of amplifier 11 is used to control driver 15 which supplies one phase of the two-phase servo motor 16. The servo motor 16 includes a reference supply which energizes the other phase and the motor is caused to rotate at a speed and in a direction proportional to the signal applied thereto in a manner well known in the art. Tachometer generator 17 is mechanically coupled to motor 16 to provide an alternating current signal 18, the phase and amplitude of which is proportional to the direction and speed, respectively, of the motor.

The tachometer signal 18 is fed back to amplifier 10 via adding circuit 14. The amplifier thus receives an input or control signal 9 from adding circuit 14 which comprises the input signal 13 and the tachometer signal 18 such that the servo motor 16 is responsive to the difference therebetween. Any difference in phasing between the tachometer signal 18 and the input signal 13 results in quadrature components present in the control signal 9 of amplifier 10.

A compensating feedback signal is developed to cancel the quadrature components appearing at adding network 14 and also compensate for phase shift which occurs within the amplifiers 10 and 11 as follows. The output 41 of amplifier 11 is applied to demodulator 21 to provide a direct current signal related to the quadrature component of the fundamental signal, the polarity of which is a function of the phase of the quadrature voltage and the amplitude of which is related to the magnitude of the quadrature component. The direct current signal is filtered by filter 22 and applied to modulator 23 which produces a square-wave signal, the frequency and time phase of which are determined by the reference voltage applied thereto and the amplitude and polarity or phase of which are determined by the amplitude and polarity of the direct current signal output of filter 22. The output of modulator 23 is then phase shifted, if necessary, so that the feedback signal 25 will be in opposition to the quadrature voltages appearing at adding network 14. The adding network output signal 9 is then fed to amplifier 10.

The detailed structure and operational details of the combined amplifier circuit 26 enclosed within the block "A" of FIG. 1 and including the subject invention may be best explained with reference to FIG. 2.

Referring to FIG. 2, amplifier 10 is shown as a two-stage resistance-capacitance coupled transistor amplifier. The control signal 9, appearing across resistor 27, is applied to the base 28 of transistor 29 of the input stage. A parallel-T type of filter 12 is connected between amplifiers 10 and 11. In the interests of brevity and clarity, the details of construction of amplifiers 10 and 11 will be omitted since there are numerous suitable servo amplifiers well known in the art. Similarly, the detailed structure and operation of the filter 12, which may be of a type other than a parallel-T, will be omitted in the interests of brevity. For a more detailed discussion of the parallel-T filter, reference may be had to standard texts, such as "Transmission Lines and Networks," published by McGraw-Hill Company in 1950 and written by Walter C. Johnson, and the references cited therein. It is sufficient to point out that the filter 12 is a low pass filter and the filter is placed between amplifiers 10 and 11, rather than in series with the modulator 23, to filter not only the high frequency or harmonic quadrature components provided by modulator 23 but also other high frequency signals which may be present in the input signal 13. The filter 12 in a 400 cycle servo system, for example, may be designed to pass all frequency components below 800 cycles per second and highly attenuate all higher frequency signals.

The output 41 of amplifier 11 energizes the primary winding 35 of coupling transformer 36 which is resonated to the signal frequency by shunt capacitor 37. Connected in parallel with primary 35 is the primary of output coupling transformer 40 which energizes driver 15.

The secondary 38 of transformer 36 is connected across opposite junctions of rectifier ring 39 of demodulator 21. The rectifiers which constitute the arms of ring 39 are poled such that unlike elements are connected together at the ring junctions. It has been found desirable to utilize matched diodes and a suitable diode has been found to be the type 1N303. The remaining junctions of rectifier ring 39 are connected through transformer 43 to a source of refenence voltage 44. The reference voltage 44 is in phase quadrature with the fundamental signal 41 at secondary 38.

Capacitor 45 is connected across the secondary of transformer 43 to bypass high frequency noise from the rectifier ring 39. The output of demodulator 21 appears between the center tap of the secondary winding of transformer 43 and the center tap of the secondary winding of transformer 36 which couples the amplifier output signal 41 to the demodulator ring. The output circuit of demodulator 21 is completed through resistors 46 and 47 and the input circuit of modulator 23.

The biasing or switching action provided by the reference voltage signal 44 determines the polarity of the signal developed across the output circuit but does not cause any current flow in the output circuit. Current flow in the output circuit of demodulator 21 is derived through current flow in the circuit including transformer 38 and rectifier ring 39. The current which flows in the output circuit of demodulator 21 is a full-wave rectified current having a direct current component, the polarity of which is related to the phase difference between the reference signal 44 and the amplifier output signal 41 and the amplitude of which is determined by the magnitude of the quadrature component of the output signal.

The alternating current ripple is removed from the output of demodulator 21 through the action of resistance-capacitance filter 22 which comprises series resistors 46 and 47 and shunt capacitors 50 and 51.

The direct current signal provided by the demodulator 21 is proportional to the quadrature phase components of amplifier output signal 41 and is modulated to produce a signal which may be combined in opposition with quadrature components of the amplifier input signals at adding network 14. The modulator 23 includes a rectifier ring 52 with a resistor in series with a diode in each of the four arms. The diodes associated with rectifier ring 52 are poled such that unlike elements are connected together at two ring junctions and unlike elements are separated from the remaining junctions by the series resistor in each arm and a potentiometer connected between the resistors. The wipers 58 and 59 of the potentiometers 56 and 57, respectively, provide variable ring junctions such that adjustment of the ring may be obtained through variation thereof. The ring output appears across load resistors 63 and 64 connected between wipers 58 and 59. The junction 65 between resistors 63 and 64 is connected to the center tap of the secondary winding of transformer 38.

An alternating current reference voltage 53 is applied through a transformer 54 to the remaining junctions of rectifier ring 52. A capacitor 61 is connected across the ends of the secondary of transformer 54 to bypass high frequency components which may be introduced through the transformer. The direct current output signal of filter 22 is connected across the center tap 60 of transformer 54 and the junction of load resistors 63 and 64.

The frequency of reference voltage 53, as is that of reference voltage 44, is the system frequency which in the particular equipment described is 400 cycles per second. The reference voltage 53 is at phase quadrature with the input signal 13. The diode ring 52 chops the direct current input through the commutating action of the diodes to provide an output which is essentially a square-wave signal, the frequency and time phase of which are determined by the reference voltage 53. The amplitude and polarity or phase of the square-wave signal are determined by the magnitude and polarity of the direct current output of demodulator 21.

The modulator output signal is developed across resistors 63 and 64 and is fed through phase shift network 24, if a phase shift is required, to provide a signal which is 180° out of phase with the quadrature components of the input signals at adding network 14.

The feedback signal 25 is fed to resistor 69, a part of adding network 14. The tachometer signal 18 is fed to resistor 70, and the input signal 18 is fed to resistor 20, with resistors 70 and 20 being part of adding network 14 which develops a resultant or control signal 9 across resistor 27. Feedback signal 25 will therefore cancel the effects of quadrature voltages appearing at the input of amplifier 26.

It was found that the suppression of quadrature components through use of a feedback path provides a circuit in which the rectifier rings 39 and 52 need not be critically balanced. While matched diodes were used and potentiometers 56 and 57 facilitate the balancing of modulator ring 52, the balancing was found to be less critical than in general diode ring circuits of the type described. Any unbalance which tends to produce a quadrature voltage output from the ring modulator will be automatically suppressed. For example, if a quadrature signal component appears at the amplifier input as a result of ring unbalance, this signal is amplified by amplifiers 10 and 11 and fed back through the feed-back path including demodulator 21 and modulator 23 with a phase which opposes the quadrature signal caused by the ring unbalance. Such an advantage would not be realized if the rectifier rings were not included in the feedback path.

It frequently occurs that in a servo system three-phase alternating current signals are readily obtainable, whereas reference signals at quadrature with the input signal are not so readily available. Under such circumstances the three-phase signals may be used and the correct phasing of signals obtained between the various control and reference signals as follows. The normal phase shift through the amplifiers 10 and 11 can, by design, be made to be 90°. One phase of the three-phase supply which is in phase with the input signal 13 may then be used as reference signal 44 and will be in phase quadrature with the amplifier output signal 41 which is shifted 90° from the input signal. The reference signal 53 may be obtained from that phase of the three-phase supply which is 120° leading relative to that used for reference signal 44. It is thereupon necessary to phase shift the output signal of modulator 23 by phase shift network 24 thirty degrees (30°) so it will be only 90° leading and may be introduced with the correct phase to adding network 14.

The phase shift network 24 comprising the series connection of resistors 66 and 67 and capacitor 68 is provided to accomplish the 30° phase shift although other types of phase shift networks could be used. The output of the phase shift network feedback signal 25 is taken from between resistors 66 and 67.

With such an arrangement, if the driver 15 is designed to have zero phase shift, the reference signal applied to motor 16 can be taken from the phase of the three-phase supply which is in phase with the input signal 13.

Another important advantage derived through use of the circuit described is that the phase shift through the amplifier 26 is fixed through the action of the feedback circuit and can be made to be essentially constant. If we assume that the amplifiers 10 and 11, in the case of a three-phase reference supply, instead of causing a 90° phase shift cause a phase lag deviation from the 90° to be introduced into the output signal through changes in circuit parameters such as are caused, for example, by the effect of temperature changes on the circuit components, then the amplifier output signal 41 will contain some quadrature phase components. The quadrature phase components due to the phase lag introduced by the amplifier will produce a feedback signal 25 through the action of the feedback path including demodulator 21 and modulator 23. The feedback signal when added to the detected signal 13 produces a leading amplifier input signal 9, and the angle of lead is sufficient to phase shift the output of the amplifier back to where it should be. The effectiveness of the resultant zero phase shift is a function of the gain of amplifiers 10 and 11. Thus, the subject invention includes an automatic phase correction for any changes in phase which occur to signals passing through the amplifier 26 and provides a constant phase amplifier.

The frequency at which the phase elimination or rejection is accomplished is determined by the frequency of the reference signals 44 and 53. Therefore, undesired phase components of any frequency can be selectively eliminated from a composite signal through proper selection of the reference signal frequencies.

It is also possible to provide two feedback channels, each including a demodulator 21, and modulator 23 to selectively reject any desired frequency signal and provide a band elimination filter. The frequency of the reference signals 44 and 53 associated with the demodulator 21 and modulator 23, respectively, would be the desired rejection frequency and one feedback path could be utilized to reject quadrature components and the other to reject the 90° displaced in-phase components through a proper phasing of the reference signals. The subject arrangement could then be utilized either as a frequency or phase rejection circuit.

Therefore, while particular embodiments of the subject invention have been shown and described herein, they are in the nature of description, rather than limitation; and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A constant phase shift alternating current amplifier adapted for use in a servo system comprising; alternating current amplifying means having an alternating current input and output, feedback means interconnecting said output and input to selectively cancel undesired phase components of signals of a particular frequency appearing at said input, said feedback means including a demodulator to provide a direct current signal proportional to said undesired phase components of the signal provided by said output, said demodulator having a reference voltage supplied thereto at said particular frequency and at a phase with said output such as to provide said direct current signal, a modulator to provide an alternating signal related to said direct current signal, said modulator having a reference voltage supplied thereto at said particular frequency, and means to combine said alternating signal at a phase with the alternating current signal at said input such as to cancel said undesired phase components.

2. A constant phase shift amplifier adapted for use in a servo system comprising; amplifying means having an input and output, means interconnecting said output and input to selectively cancel undesired phase components of signals of a particular frequency appearing at said input, said means including a demodulator to provide a direct current signal proportional to said undesired phase components of the signal provided by said output, said demodulator comprising a rectifier ring with said output connected to opposite corners thereof and a reference signal connected to the remaining corners thereof, said rectifiers being poled such and said reference signal being at said particular frequency and at phase quadrature with said undesired phase components appearing at said output to provide said direct current signal, a modulator to provide an alternating signal at said particular frequency and related to said direct current signal, said modulator comprising a rectifier ring and having a reference voltage supplied to opposite corners thereof at said particular frequency, and means to combine said alternating signal at a phase with the signal at said input such as to cancel said undesired phase components.

3. A constant phase shift amplifier adapted for use in a servo system comprising; amplifying means having an input and output, said amplifying means including at least two stages of amplification, means interconnecting said output and input to selectively cancel undesired phase components of signals of a particular frequency appearing at said input, said means including a demodulator to provide a direct current signal proportional to said undesired phase components of the signal provided by said output, said demodulator comprising a rectifier ring with said output connected to opposite corners thereof and a reference signal connected to the remaining corners thereof, said rectifiers being poled such and said reference signal being at said particular frequency and at a phase such as to provide said direct current signal, a modulator to provide an alternating signal at said particular frequency and related to said direct current signal, said modulator comprising a rectifier ring and having a reference voltage supplied to opposite corners thereof at said particular frequency, means to combine said alternating signal at a phase with the signal at said input such as to cancel said undesired phase components, and a filter between said amplifier stages to attenuate signals above said particular frequency.

4. A constant phase shift alternating current amplifier adapted for use in a servo system comprising; alternating current amplifying means having an input network and an output, said output being connected to a motor, means responsive to the rotation of said motor to derive an electrical signal related thereto, said electrical signal being connected to said input network, means to supply an alternating current amplifier input signal to said input network, feedback means interconnecting said output and input network to selectively cancel undesired phase components of signals of a particular frequency appearing at said input, said feedback means including a demodulator to provide a direct current signal proportional to said undesired phase components of the signal provided by said output, said demodulator having a reference voltage supplied thereto at said particular frequency and at phase quadrature to said undesired phase components appearing at said output signal, a modulator to provide an alternating signal related to said direct current signal, said modulator having a reference voltage supplied thereto at said particular frequency, and means to combine said alternating signal with the signal at said input to cancel said undesired phase components.

5. A constant phase shift amplifier adapted for use in a servo system comprising; amplifying means having an input and output, feedback means interconnecting said output and input to selectively cancel undesired phase components of signals of a particular frequency appearing at said input, said feedback means including a demodulator to provide a direct current signal proportional to said undesired phase components of the signal provided by said output, said demodulator having a reference voltage supplied thereto at said particular frequency and at a phase such as to provide said direct current signal, a modulator to provide an alternating signal related to said direct current signal, said modulator having a reference voltage supplied thereto at said particular frequency, said amplifier providing a 90 degree phase shift therethrough, said reference voltages being supplied by two signals one of which is in phase with said input and the other of which is 120 degrees therefrom, said one signal supplying said demodulator reference voltage, said other signal supplying said modulator reference voltage, and a 30 degree phase shift network between said modulator and said input for said alternating signal, and means to combine said alternating signal with the signal at said input to cancel said undesired phase components.

6. A constant phase shift amplifier adapted for use in a servo system comprising; amplifying means having an input and output, means interconnecting said output and input to selectively cancel undesired phase components of signals of a particular frequency appearing at said input, said means including a demodulator to provide a direct current signal proportional to said undesired phase components of the signal provided by said output, said demodulator comprising a rectifier ring with said output connected to opposite corners thereof and a reference signal connected to the remaining corners thereof, said rectifiers being poled such and said reference signal being at said particular frequency and at phase quadrature with said output to provide said direct current signal, a modulator to provide an alternating signal at said particular frequency and related to said direct current signal, said modulator comprising a rectifier ring and having a reference voltage supplied to opposite corners thereof at said particular frequency, said amplifier providing a 90 degree phase shift therethrough, said reference voltages being supplied by two signals one of which is in phase with said input and the other of which is 120 degrees therefrom, said one signal supplying said demodulator reference voltage, said other signal supplying said modulator reference voltage, and a 30 degree phase shift network between said modulator and said input for said alternating signal, and means to combine said alternating signal at a phase with the signal at said input such as to cancel said undesired phase components.

References Cited in the file of this patent

UNITED STATES PATENTS

| | | |
|---|---|---|
| 2,355,991 | Meyers | Aug. 19, 1944 |
| 2,671,875 | Urbanik | Mar. 9, 1954 |
| 2,857,561 | Leitch | Oct. 21, 1958 |
| 2,857,562 | Umrath | Oct. 21, 1958 |
| 2,887,637 | Nekola | May 19, 1959 |
| 2,901,563 | McAdam | Aug. 25, 1959 |
| 2,921,267 | Thomas | Jan. 12, 1960 |